United States Patent [19]

Banta

[11] 4,447,314

[45] May 8, 1984

[54] DEMETALATION, DESULFURIZATION, AND DECARBONIZATION OF PETROLEUM OILS BY HYDROTREATMENT IN A DUAL BED SYSTEM PRIOR TO CRACKING

[75] Inventor: Frederick Banta, Elmer, N.J.

[73] Assignee: Mobil Oil Corporation, New York, N.Y.

[21] Appl. No.: 375,079

[22] Filed: May 5, 1982

[51] Int. Cl.$^3$ .................. C10G 65/04; C10G 65/12
[52] U.S. Cl. ................. 208/89; 208/216 PP; 208/251 H
[58] Field of Search ............ 208/89, 216 PP, 251 H

[56] References Cited

U.S. PATENT DOCUMENTS

| | | | |
|---|---|---|---|
| 3,674,680 | 7/1972 | Hoekstra et al. | 208/111 |
| 3,980,552 | 9/1976 | Mickelson | 208/216 PP |
| 4,016,067 | 4/1977 | Fischer et al. | 208/89 |
| 4,028,227 | 6/1977 | Gustafson | 208/216 PP |
| 4,133,777 | 1/1979 | Frayer et al. | 252/465 |
| 4,328,130 | 5/1982 | Kyan | 252/477 R |

*Primary Examiner*—Delbert E. Gantz
*Assistant Examiner*—O. Chaudhuri
*Attorney, Agent, or Firm*—Alexander J. McKillop; Charles J. Speciale; Michael G. Gilman

[57] ABSTRACT

A process is described for hydrotreating residual oil fractions in an improved dual bed catalyst system comprising a first large-pore catalyst and a second small-pore catalyst in which at least the second catalyst and preferably both catalysts have a quadrulobal shape. Using cobalt and molybdenum composited on alumina as these catalysts, residua are demetalized, desulfurized, and reduced in carbon residue, whereby hitherto unusable residue can be hydroprocessed.

12 Claims, 6 Drawing Figures

DEMETALATION, DESULFURIZATION, AND DECARBONIZATION OF PETROLEUM OILS BY HYDROTREATMENT IN A DUAL BED SYSTEM PRIOR TO CRACKING

BACKGROUND OF THE INVENTION

1. Field of the Invention

This invention is concerned with an improved catalytic process for the demetalation and desulfurization of petroleum oils, preferably those residual fractions that have undesirably high metals and/or sulfur, and additionally decarbonization and/or reduction of CCR content. More particularly, the invention involves two catalysts with distinctly different pore sizes, arranged in a dual catalyst system that is especially effective for the demetalation, desulfurization, and decarbonization of petroleum oils. Both catalysts are exemplified by the cobalt-molybdenum-on-alumina type. The catalysts are extruded in selected quadrulobal shapes.

2. Description of the Prior Art

Residual petroleum oil fractions produced by atmospheric or vacuum distillation of crude petroleum are characterized by relatively high metals, sulfur, and/or CCR content. This comes about because practically all of the metals present in the original crude remain in the residual fraction, attached to polycyclic and highly aromatic compounds, and a disproportionate amount of sulfur in the original crude oil also remains in that fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. This is so because the metal contaminants deposit on the special catalysts for these processes and cause the formation of inordinate amounts of coke, dry gas, and hydrogen.

It is current practice to upgrade certain residual fractions by a pyrolitic operation known as coking. In this operation, the residuum is destructively distilled to produce distillates of low metals content and leave behind a solid coke fraction that contains most of the metals. Coking is typically carried out in a reactor or drum operated at about 800° to 1100° F. temperature and a pressure of one to ten atmospheres. The economic value of the coke by-product is determined by its quality, especially its sulfur and metals content. Excessively high levels of these contaminants makes the coke useful only as low-valued fuel. In contrast, cokes of low metals content, for example up to about 100 p.p.m. (parts-per-million by weight) of nickel and vanadium, and containing less than about 2 weight percent sulfur may be used in high valued metallurgical, electrical, and mechanical applications.

Carbon residue may be determined by the Conradson Carbon Residue test. This test is important because Conradson carbon precursors generate surface coke on a catalyst, and the excess formation of coke upsets the heat balance of the catalytic cracking process. In general, higher-boiling range fractions contain more Conradson carbon or coke precursors. Light distillate oils may have a carbon residue less than 0.05 percent, but a vacuum residual oil may have a Conradson carbon value of 21 percent to 30 percent. Such a high Conradson carbon content, particularly when combined with excessive metals content and free radical content, essentially renders ineffective most conventional catalysts and catalytic treating processes.

The effect of such high carbon residue is that many residual petroleum feedstocks are unsuitable for use as FCC feedstocks, even if metals content and sulfur content are at acceptably low values.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking is generally done utilizing hydrocarbon chargestocks lighter than residual fractions which generally have an API gravity less than 20. Typical cracking chargestocks are coker and/or crude unit gas oils, vacuum tower overhead, etc., the feedstock having an API gravity from about 15 to about 45. Since these cracking chargestocks are distillates, they do not contain significant proportions of the large molecules in which the metals are concentrated. Such cracking is commonly carried out in a reactor operated at a temperature of about 800° to 1500° F., at pressure of about 1 to 5 atmospheres, and a space velocity of about 1 to 1000 WHSV.

The amount of metals present in a given hydrocarbon stream is often expressed as a chargestock's "metals factor". This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a chargestock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker, since chargestocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions (having a metals factor of about 2.5 to 50) suitable for cracking chargestocks.

Metals and sulfur contaminants present similar problems with regard to hydrocracking operations which are typically carried out on chargestocks even lighter than those charged to a cracking unit. Hydrocracking catalyst is so sensitive to metals poisoning that a preliminary or first stage is often utilized for trace metals removal. Typical hydrocracking reactor conditions consist of a temperature of 400° to 1000° F. and a pressure of 100 to 3500 psig.

It is evident that there is considerable need for an efficient method to reduce the metals and/or sulfur content and/or residual carbon content of petroleum oils, and particularly of residual fractions of these oils. While the technology to accomplish this for distillate fractions has been advanced considerably, attempts to apply this technology to residual fractions generally fail due to very rapid deactivation of the catalyst, presumably by metals contaminants and coke deposition on the catalyst.

U.S. Pat. No. 3,730,879, issued May 1, 1973, discloses a two-bed catalytic process for the hydrodesulfurization of crude oil or a reduced fraction, in which at least 50 percent of the total pore volume of the first-bed catalytic consists of pores in the 100–200 Angstrom diameter range.

U.S. Pat. No. 3,830,720, issued Aug. 20, 1974, discloses a two-bed catalytic process for hydrocracking and hydrodesulfurizing residual oils, in which a small-pore catalyst is disposed upstream of a large-pore catalyst.

U.S. Pat. No. 3,876,523, issued Apr. 8, 1975, describes a novel catalyst and a process for catalytically demetalizing and desulfurizing hydrocarbon oils comprising residual fractions. This entire specification is incorporated herein by reference. The process described therein utilizes a catalyst comprising a hydrogenation component, such as cobalt and molybdenum oxides, composited on an alumina, at least a portion of which is in the delta and/or theta phase, with at least 60% of the pore volume of the catalyst in pores having a diameter of 100 Angstroms to 200 Angstroms, also having at least about 5% of the pore volume contributed by pores having a diameter greater than 500 Angstroms and having other characteristics as hereinafter described. As will be shown, although this catalyst is highly effective for demetalation of residual fractions and has good stability with time on stream, its utility is remarkably improved when this catalyst is employed in a particular manner in combination with a second catalyst having different critical characteristics. For convenience, a catalyst of the type described in U.S. Pat. No. 3,876,523 will be referred to herein as a first catalyst, it being understood that this first catalyst is to be situated upstream of the second catalyst having different characteristics.

A family of catalysts has been developed, based on a discovery, disclosed in U.S. Pat. No. 3,674,680, issued July 4, 1972, that metallic contaminants in a petroleum residuum that is hydroprocessed over small catalyst particles penetrate to a depth of 0.0085 inch from the particle surface and further based on the presumption that resid molecules do not penetrate much further. It was thus reasoned that an ideal catalyst would be one which has all points in the catalyst particle at a distance no greater than about 0.0085 inch from the particle surface, so as to eliminate any wasted catalyst material. It was therefore concluded that catalyst shape characteristics would desirably include concavity in addition to convexity, as in conventional spherical particles.

This family of catalysts is disclosed in British Pat. No. 1,446,175, issued Aug. 18, 1976, in Canadian Patent No. 1,007,187, issued Mar. 22, 1977, in Canadian Patent No. 1,015,350, issued Aug. 9, 1977, in U.S. Pat. No. 3,674,680, issued July 4, 1972, in U.S. Pat. No. 3,957,627, issued May 18, 1976, in U.S. Pat. No. 3,966,644, issued June 29, 1976, in U.S. Pat. No. 3,900,964, issued Nov. 9, 1976, in U.S. Pat. No. 4,028,227, issued June 7, 1977, in U.S. Pat. No. 4,118,310, issued Oct. 3, 1978, in U.S. Pat. No. 4,133,777, issued June 9, 1979, and in U.S. Pat. No. 4,153,539, issued May 8, 1979.

U.S. Pat. No. 4,153,539 discloses that improved hydrogen utilization and/or higher conversions of desired product is obtained in hydrotreating or hydrocracking processes when using amphora particles for hydrotreating of light hydrocarbon fractions, catalytic reforming, fixed-bed alkylation processes, and the like.

U.S. Pat. No. 4,133,777 teaches a process in which feed oil initially flows downwardly in trickle flow through a fixed bed of non-promoted catalysts, which removes a significant amount of feed metals and sulfur from the oil, and then passes downwardly through a fixed bed of promoted catalysts containing selected GROUP VI and GROUP VIII metals, with very little hydrocracking occurring in this combination process.

In the hydrodesulfurization process of U.S. Pat. No. 4,118,310, the temperature should be sufficiently low so that not more than 30% and preferably as little as 10% of the 650° F.+ (343° C.+) feed oil will be cracked to material boiling below 650° F. (343° C.), suitably using a hydrodesulfurization catalyst with four projections formed by four grooves and having a 1/36 inch (0.07 cm) diameter dimension.

In the hydrotreating process of U.S. Pat. Nos. 4,028,227 and 3,966,644 with polylobal catalyst particles, hydrodesulfurization is primarily accomplished with hydrocracking, nitrogen removal, and aromatic saturation occurring to a limited extent.

Using a cloverleaf-shaped catalyst for hydroprocessing an atmospheric resid, it is disclosed in U.S. Pat. No. 3,674,680 that the resid feed is cracked into lower boiling hydrocarbons and/or desulfurized and demetalized, with conversion of feed boiling above 650° F. to products boiling below 650° F. being typically 27 volume percent.

It was reported in U.S. Pat. No. 4,016,067, the entire specification of which is incorporated herein by reference, that hydrocarbon oils, preferably residual fractions, are catalytically hydroprocessed to very effectively remove both metals and sulfur and with particularly slow aging of the catalyst system by contacting the oil sequentially with two catalysts of different characteristics. The first catalyst, located upstream of the second catalyst, is characterized by having at least 60% of its pore volume in pores greater than 100 A. in diameter and other characteristics hereinafter specified. The second catalyst, located downstream with respect to the first catalyst, is characterized by having a major fraction of its pore volume in pores less than 100 A. in diameter.

The dual catalyst apparatus of U.S. Pat. No. 4,016,067 may be used to demetalize and/or desulfurize any hydrocarbon oil that has metals and/or sulfur content undesirably high for a particular application. The dual catalyst apparatus is particularly effective for preparing low metals and/or low sulfur content feedstocks for catalytic cracking or for coking. In the processing to remove metals and sulfur, and hydrocarbon oil also is concomitantly enriched in hydrogen, making it an even more suitable chargestock for either of these processes.

SUMMARY OF THE INVENTION

It has now been discovered that large-pore quadrulobe shaped catalysts provide greater metals deposition capacity as a first (upstream) catalyst and consequently improved aging characteristics, as compared to large-pore cylindrical extrudates. A convenient method for preparing these catalysts is to use the procedures of U.S. Pat. No. 4,016,067. It has further been discovered that small-pore quadrulobe-shaped catalysts, as compared to cylindrical extrudates, have a greater surface-to-volume ratio which minimizes diffusion limitations and increases the amount of metals which can be deposited on the catalyst. It has additionally been discovered that this small-pore quadrulobe-shaped catalyst, as a second catalyst in the system of U.S. Pat. No. 4,016,067, produces a higher quality FCC feedstock from petroleum residua than a smaller diameter cylindrical catalyst having the same composition and properties. It has also been discovered that the quadrulobe catalyst is significantly more active than the trilobe catalyst for desulfurization and CCR removal. This property of being able to remove residual Conradson carbon is important because it can enable many residual petroleum stocks to become FCC feedstocks that would otherwise be unavailable.

DESCRIPTION OF THE PREFERRED EMBODIMENTS

Figure 1:
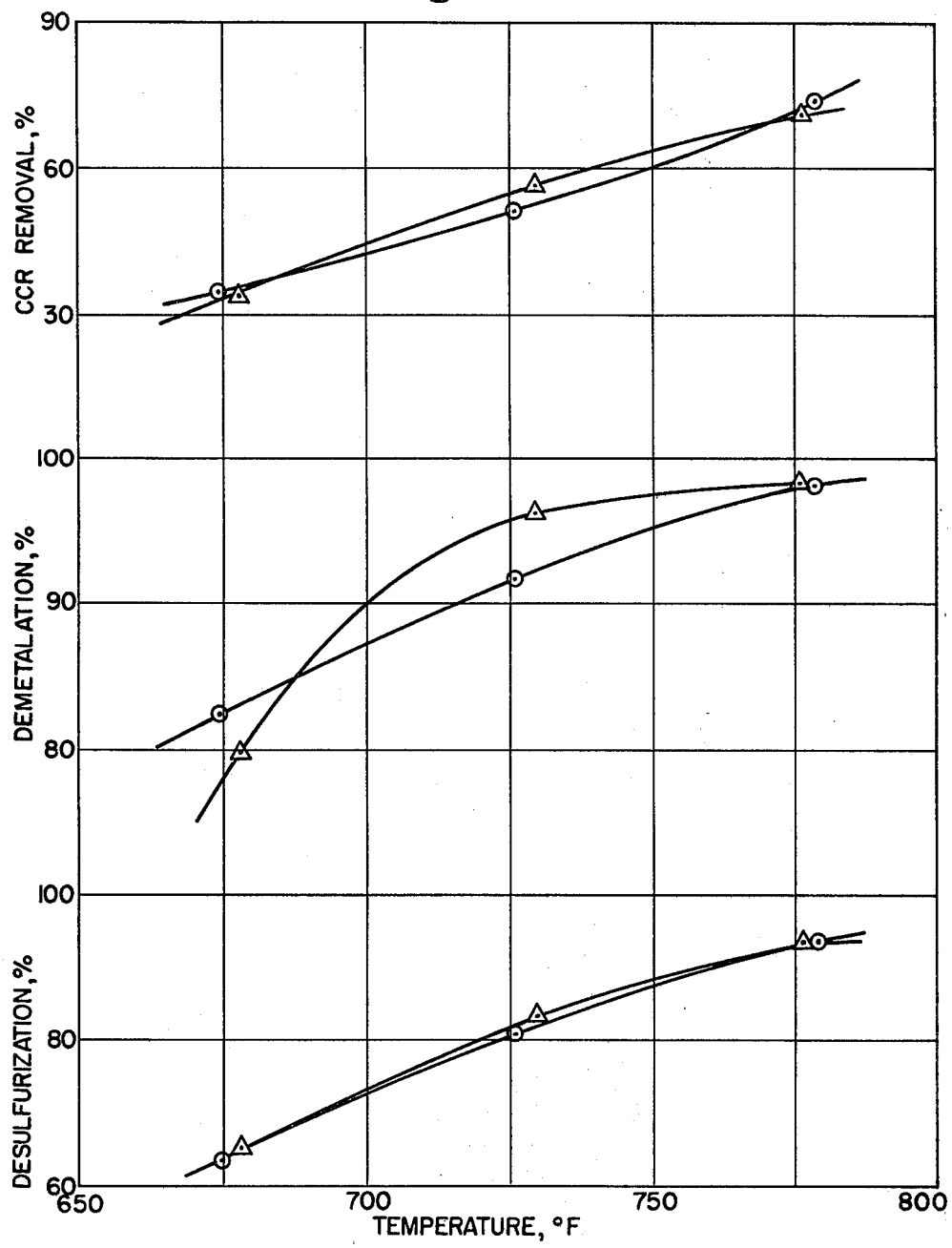
FIG. 1 is a graph comparing three properties of large-pore quadrulobe-shaped and large-pore cylindrical catalysts over a range of hydrotreating temperatures.

The preferred first catalyst of the dual catalyst system is selected from the class of catalysts comprising a hydrogenating component (cobalt and molybdenum in a preferred embodiment) composited with an alumina support having a demonstrable content of delta and/or theta alumina. The preferred composite catalyst also has at least 60% of its pore volume in pores having a diameter of about 100 A. to 200 A., at least about 5% of the pore volume in pores greater than 500 A. in diameter, and has a surface area of up to about 110 m²/g. The first catalyst also has a high-temperature phase delta and/or theta alumina present in sufficient quantity for it to be detectable by X-ray diffraction, i.e., it has a demonstrable content of delta and/or theta phase alumina. It is highly preferred, according to this invention, that the first catalyst be a large-pore quadrulobal extrudate.

The second catalyst of the dual catalyst system of this invention is selected from the class of catalyst comprising a hydrogenation component (cobalt and molybdenum in a preferred embodiment) composited with a refractory base (alumina in a preferred embodiment), said composite catalyst having at least 60% of its pore volume contributed by pores that have a diameter of 30 to 100 Angstroms, herein defined as "small pore", and a surface area of at least 150 square meters per gram, and preferably a surface area of at least 175 square meters per gram. It is essential according to this invention, however, that the second catalyst be a small-pore quadrulobal extrudate.

The hydrogenating component of the first and second catalysts disclosed herein can be any material or combination thereof that is effective to hydrogenate and desulfurize the chargestock under the reaction conditions utilized. For example, the hydrogenating component is selected from at least one member of the group consisting of Group VIB and the iron group metals in a form, such as metal oxides or sulfides, capable of promoting hydrogenation reactions. Especially effective catalysts for the purposes of this invention are those comprising molybdenum and at least one member of the iron group metals. Preferred catalysts are those containing cobalt and molybdenum, but other combinations of iron group metals and molybdenum may be used, such as iron, or zinc, or nickel and molybdenum, as well as combinations of nickel and molybdenum, cobalt and molybdenum, nickel and tungsten or other Group VIB or Group VIII metals of the Periodic Table taken singly or in combination. Particularly preferred compositions for the first and second catalysts to be used in the process of this invention are those that contain on a weight basis from about 2 percent to about 6 percent cobalt or nickel and from about 10 percent to about 16 percent molybdenum, the remainder consisting of alumina. These metals may be composited with the alumina by any of the known methods.

It is well known by those skilled in the art that the characteristics of composited alumina catalysts, such as the first and second catalysts in the process of this invention, depend to a very large extent on the properties of the alumina support. The first catalyst herein referred to is believed to have an unusual and novel physical structure especially as reflected in its phase composition and in its distribution of pore sizes. While this is more fully described in U.S. Pat. No. 3,876,523, herein incorporated by reference, it might be mentioned here that this catalyst may be prepared from a technical grade of boehmite, recovered from aluminum alkyl catalysts used in olefin polymerizations. Aside from a small amount of volatile organic alcohol, this boehmite has been found to be very pure, containing less than 0.01% of any silica, iron oxide, sodium oxide, and sulfur. Furthermore, in the preparation of the alumina support, it is required that the alumina be calcined to about 1950° F. This is about the transition point between delta and theta alumina phases, and it is believed that the presence of either one or both of these phases in the catalyst is responsible for the unusual properties of the first catalyst.

The second catalyst of this invention may be commercial hydrodesulfurization catalyst such as Catalyst HDS-1441 manufactured by American Cyanamid Corporation. Commercially available alumina supports may be impregnated with cobalt and molybdenum salts followed by calcination. As commonly prepared on a commercial scale, the size of the pores of such alumina supports is largely concentrated at about 50 Angstroms diameter, and the alumina is of the gamma variety.

While various extrudate sizes of the first and second catalysts may be used in the dual bed system of this invention, it is preferred to use quadrulobal extrudate of about 1/20 to 1/40 inch diameter.

It will be recognized that in both of the configurations disclosed in U.S. Pat. No. 4,016,067, the hydrocarbon feed contacts the first catalyst before it contacts the second catalyst, i.e., the first catalyst is disposed upstream of the second catalyst. The first catalyst preferably should be present in from about 40 to 80 percent of the total catalyst volume, the second catalyst occupying the corresponding remainder of from about 60 to 20 percent. The higher proportions of first catalyst are preferred when the metal contamination is relatively high compared with the sulfur contamination and vice versa. While it is to be understood that other catalyst configurations and modes of operation may be used in the practice of this invention, it is particularly preferred to operate the contacting of the feed with the dual bed system in trickle bed fashion.

Another manner of disposing of the first and second catalysts which results in maintaining a low metals content in the treated oil is to resort to a three-zone arrangement, with a small fraction of the first catalyst placed at the end of the reactor. Thus, in such an arrangement, one may use 50 percent first catalyst, 40 percent second catalyst, and 10 percent first catalyst in sequence going downstream, percentages meaning percent of total catalyst volume in each instance.

Although presulfiding of the catalyst is preferred, this is not essential as the catalyst will normally become sulfided in a very short time by contact, at the process conditions disclosed herein, with the high sulfur content feedstocks to be used. The catalyst can be presulfided, after calcination, or calcination and reduction, prior to contact with the chargestock, by contact with a sulfiding mixture of hydrogen and hydrogen sulfide, at a temperature in the range of about 400° to 800° F., at atmospheric or elevated pressures. Presulfiding can be conveniently effected at the beginning of an onstream period at the same conditions to be employedl at the start of such period.

From what has been said, it will be clear that the feedstock can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 650° F. and containing a substantial quantity of asphaltic materials.

Such residues usually have high Conradson Carbon Residuals (CCR). The Conradson test is a destructive distillation method for the estimation of carbon residues in petroleum stocks. It was developed for fuels and lubricating oils, ranging from 0 percent in gasoline to 4.5 percent in steam-cylinder oils. Designated as IP/58 and technically equivalent to ASTM D189-58, it utilizes three nesting crucibles fitted within an insulator block, supported by wire and covered with a hood. In general, Conradson carbon precursors generate surface coke on catalysts used in fluid catalytic cracking, and the excess formation of such coke upsets the heat balance of the catalytic cracking process. As an example of CCR content, a Safaniya atmospheric residuum feedstock, containing 3.9 percent sulfur, has been reported to have 12.1 percent CCR. A vacuum residual oil derived from Kuwait crude oil was reported to have a Conradson carbon value of 21.1 percent by weight.

Because such a tendency to deposit coke on FCC catalysts can be very detrimental to the process, any hydrocarbon residua must be excluded from FCC operations unless CCR content can be reduced in addition to desulfurization and demetalation. After such reduction in CCR content, additional hydrocarbon residua can become usable in FCC operations such as thermal tar from steam cracking, catalytic clarified oil, reduced crude, shale oil residua, liquified coal fractions, and other similar materials. If these materials are too viscous for easy handling, it is feasible to add a solvent such as gas oil to reduce the viscosity and permit easy pumping at moderate temperatures.

Alternatively, visbreaking or hydrovisbreaking can be utilized as an alternative procedure to the process of this invention, but doing so is at least as costly and creates smaller quantities of residua that are very heavily contaminated and have very low value. In contrast, the instant invention removes metals and sulfur and reduces the amount of carbon residue so that the entire contents of a wide range of both long and short residua, including many important stocks that have hitherto been unusable, can be utilized directly as FCC feedstocks.

Thus, the chargestock can be one having an initial or 5 percent boiling point somewhat below 650° F., provided that a substantial proportion, for example, about 70 or 80 percent by volume, of its hydrocarbon components boil above 650° F. A hydrocarbon stock having a 50 percent boiling point of about 900° F. and which contains asphaltic materials, 4% by weight sulfur and 51 p.p.m. nickel and vanadium is illustrative of such chargestock. Typical process conditions may be defined as contacting a metal and/or sulfur contaminant-containing chargestock with this invention's catalysts under a hydrogen pressure of about 500 to 3000 p.s.i.g., 600° to 850° F. temperature, and 0.1 to 5 LHSV (i.e., 0.1 to 5 volumes of chargestock per volume of catalyst per hour), based on the total complement of catalyst in the dual bed system.

The hydrogen gas which is used during the hydrodemetalation-hydrodesulfurization-hydrodecarbonization is circulated at a rate between about 1,000 and 15,000 s.c.f./bbl. of feed and preferably between about 3,000 and 8,000 s.c.f./bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. The recycled gas is usually washed with a chemical adsorbent for hydrogen sulfide or otherwise treated in known manner to reduce the hydrogen sulfide content thereof prior to recycling.

The invention may be fully understood by reviewing the following examples which include references to the drawings.

EXAMPLE I

A quadrulobe catalyst (NK 6390) was prepared by using the procedure described in U.S. Pat. No. 4,016,067 for a large-pore demetalation catalyst ( ⊙ ), and a similar large-pore cylindrical ( △ ) catalyst (SMO 8410) was similarly prepared, using the same procedures. These catalysts were found to have the properties given in Table I, when freshly prepared.

They were evaluated by hydrotreating an Arabian Light vacuum resid at 2000 psig and 0.30 LHSV over a range of temperatures from about 670° to 780° F. The results are shown in FIG. 1 in terms of percentage desulfurization, percentage demetalation, and percentage CCR removal over this temperature range.

The results show that large-pore quadrulobe and cylindrical catalysts are substantially equivalent.

TABLE I

| | Fresh Catalyst Properties | |
|---|---|---|
| Property | Large Pore Quadrulobes NK 6390 | Large Pore Demetalation Cylinders SMO 8410 |
| Surface Area, m²/gm | 124 | 112 |
| Pore Vol, cc/gm | 0.520 | 0.509 |
| Avg. Pore Dia., Å | 182 | 182 |
| Ni, wt. % | — | — |
| MoO₃, wt. % | 12.2 | 10.0 |
| CoO, wt. % | 3.7 | 3.5 |
| Pore Size Distribution, cc/gm | | |
| 0-30 Angstroms | .028 | .052 |
| 30-50 Angstroms | .002 | .006 |
| 50-80 Angstroms | .010 | .012 |
| 80-100 Angstroms | .010 | .051 |
| 100-200 Angstroms | .388 | .317 |
| 200-300 Angstroms | .057 | .005 |
| 300+ Angstroms | .025 | .066 |
| Nominal Size, in. | 1/25 | 1/32 |
| Shape | Quadrulobe | Cylinder |

EXAMPLE II

Figure 2:
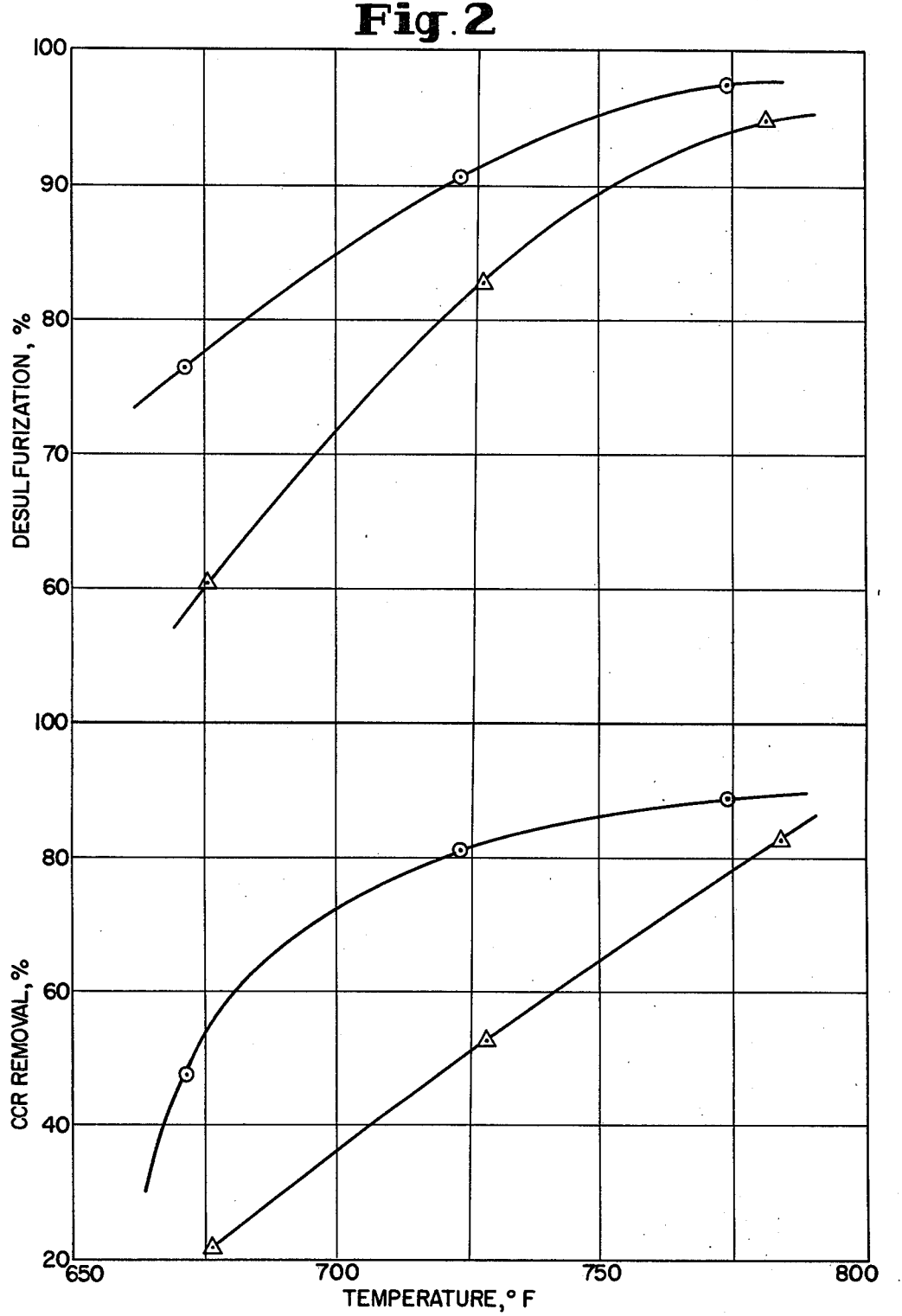
FIG. 2 is a graph comparing two properties of small-pore quadrulobe-shaped and small-pore trilobeshaped catalysts over the same range of hydrotreating temperatures, as in FIG. 1.

A proprietary small-pore quadrulobe catalyst was compared to another proprietary trilobe catalyst. The freshly prpared catalyst had the properties shown in Table II. After hydrotreating the same Arabian Light vacuum resid at 2000 psig and 0.30 LHSV over the same temperature range used in Example I, the results in terms of percentage CCR removal and percentage desulfurization are shown in FIG. 2. It is apparent that the quadrulobe (⊙) is significantly superior to the trilobe (△).

EXAMPLE III

Three catalysts were prepared with identical compositions and properties in 1/16 (△) and 1/32-inch (⊙) cylindrical extrudates and in a 1/29×1/32-inch quadrulobe extrudate. (◯). The properties of the catalyst are given in Table III.

Figure 3:
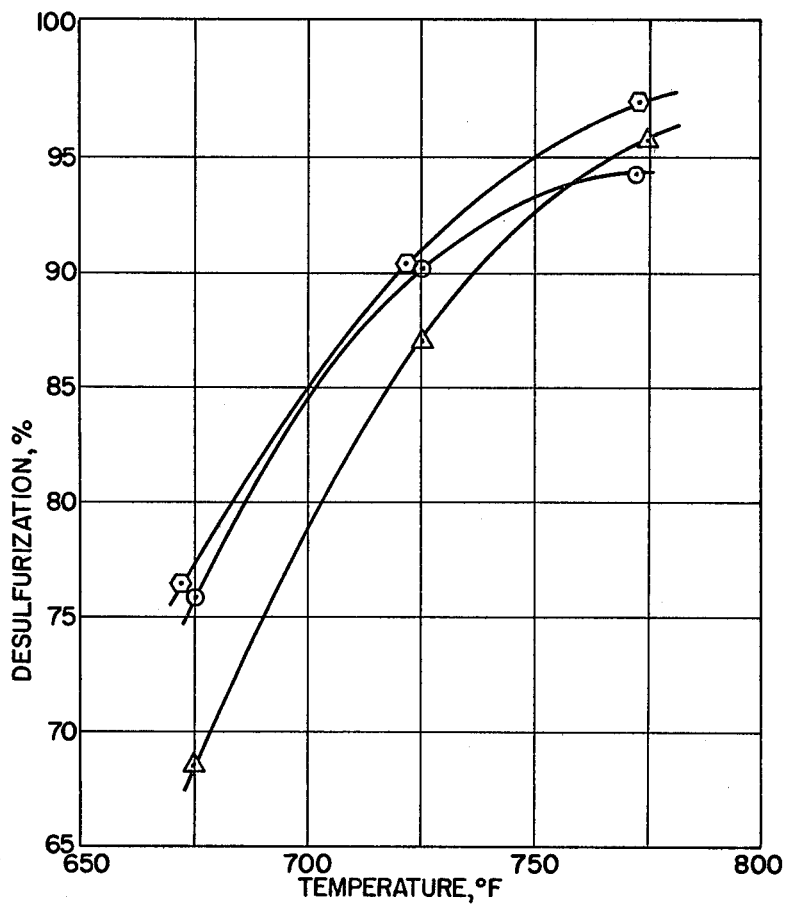
FIG. 3 is a graph comparing desulfurization activity for a small-pore quadrulobe-shaped catalyst and two small-pore cylindrical catalysts over the same range of hydrotreating temperatures.
Figure 4:
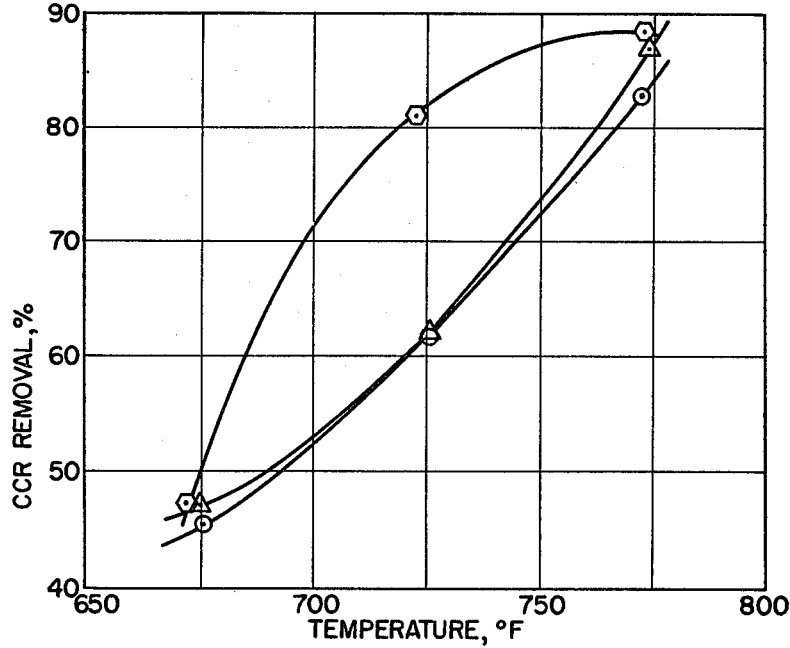
FIG. 4 is a graph comparing percentage removals of Conradson carbon residue for the same three catalysts as FIG. 3 over the same range of hydrotreating temperatures.

The activities of these catalysts were evaluated by using an Arabian Light vaccum resid, having the properties listed in Table IV, at 2000 psig, 0.30 LHSV, and 5000 SCF/Bbl hydrogen circulation. The sulfur and CCR removal activities for these three catalysts are shown in FIGS. 3 and 4 after testing on this raw resid. It is clear that the quadrulobe shape is the most active for both sulfur and CCR removal.

EXAMPLE IV

The 1/32-inch cylindrical catalyst (⊙) and the quadrulobe catalyst (◯), having the properties listed in Table II, were also evaluated as a small-pore component (second catalyst) in the dual catalyst system of U.S. Pat. No. 4,016,067. An Arabian Light vacuum resid, having the properties shown before treatment in Table IV, was hydrotreated over a proprietary large-pore catalyst to produce the properties shown after hydrotreating in Table V. This hydrotreated stock, having properties equivalent to treatment over the first catalyst of U.S. Pat. No. 4,016,067, was then processed in comparative tests over the two catalysts (J9166 and J9167) at 2000 psig, 0.30 LHSV, and 5000 SCF/bbl hydrogen circulation. The results are plotted in FIGS. 5 and 6.

TABLE II

| | Fresh Catalyst Properties | |
|---|---|---|
| Property | Small Pore Quadrulobe 153s | Trilobe HDN 1197 |
| Surface Area, M²/gm | 255 | 143 |
| Pore Vol, cc/gm | 0.513 | 0.425 |
| Avg. Pore Dia., Å | 80 | 117 |
| Ni, wt. % | 2.4 | 3.7 |
| MoO₃, wt. % | 14.6 | 21.7 |
| CoO, wt. % | — | — |
| Pore Size Distribution, cc/gm | | |
| 0-30 Angstroms | .007 | .076 |
| 30-50 Angstroms | 0.65 | 0.16 |
| 50-80 Angstroms | .383 | .041 |
| 80-100 Angstroms | .032 | .117 |
| 100-200 Angstroms | .015 | .112 |
| 200-300 Angstroms | .002 | .007 |
| 300+ Angstroms | .009 | .056 |
| Nominal Size, in. | 1/25 | 1/20 |
| Shape | Quadrulobe | Trilobe |

TABLE III

| | Catalyst Properties | | |
|---|---|---|---|
| Catalyst | J7709 | J9166 | J9167 |
| Diameter | 1/16" Cylinder | 1/32" Cylinder | 1/29" × 1/32" Quadrulobe |
| Surface Area, m²/g | 255 | 271 | 255 |
| Pore Vol., cc/g. | 0.520 | 0.525 | 0.513 |
| Mean Pore Diam., Å | 81 | 77 | 80 |
| Ni, % wt. | 3.1 | 2.4 | 2.4 |
| MoO₃, % wt. | 15.1 | 14.1 | 14.6 |
| SiO₂, % wt. | 5.0 | 5.8 | 5.1 |
| Pore Size Dist., cc/g | | | |
| 0-30 Å | 0.000 | 0.018 | 0.007 |
| 30-50 Å | 0.043 | 0.067 | 0.065 |
| 50-80 Å | 0.380 | 0.345 | 0.383 |
| 80-100 Å | 0.046 | 0.058 | 0.032 |
| 100-200 Å | 0.032 | 0.024 | 0.015 |
| 200-300 Å | 0.006 | 0.002 | 0.002 |
| 300+ Å | 0.015 | 0.011 | 0.015 |

TABLE IV

| Properties of Arabian Light Vacuum Resid | |
|---|---|
| Gravity, °API | 8.3 |
| Hydrogen, Wt. % | 10.60 |
| Sulfur, Wt. % | 3.95 |
| Nitrogen, Wt. % | 0.30 |
| Nickel, ppmw | 16 |
| Vanadium, ppmw | 68 |
| CCR, Wt. % | 15.90 |
| Asphaltenes, Wt. % | 12.0 |

TABLE V

| Properties of Arabian Light Vacuum Resid After Hydrotreating With Large-Pore Catalyst | |
|---|---|
| Gravity, °API | 18.9 |
| Hydrogen, Wt. % | 11.60 |
| Sulfur, Wt. % | 0.23 |
| Nickel, ppmw | 4.9 |
| Vanadium, ppmw | 8.0 |
| CCR, Wt. % | 8.85 |

TABLE V-continued

Properties of Arabian Light Vacuum Resid
After Hydrotreating With Large-Pore Catalyst

| Asphaltenes, Wt. % | 5.9 |
|---|---|

TABLE VI

HDT Arabian Light Vacuum Resid
2000 psig, 0.30 LHSV, 725° F.

|  | Quadrulobe | 1/32 Inch Cylinder |
|---|---|---|
| Hydrogen, Wt. % | 12.38 | 12.07 |
| Asphaltenes, Wt. % | 1.8 | 3.4 |
| Paraffins, Wt. % | 15.9 | 15.2 |
| Naphthenes, Wt. % | 32.9 | 29.3 |
| Aromatics, Wt. % | 51.2 | 55.5 |

Figure 5:
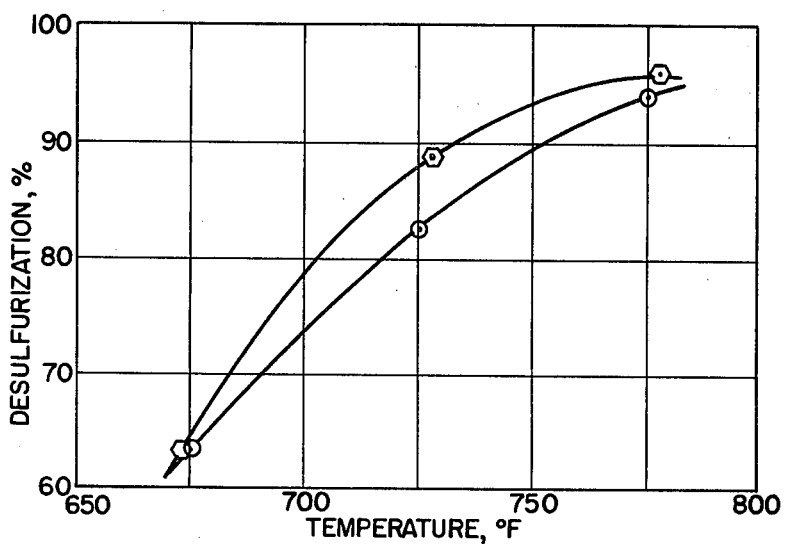
FIG. 5 is a graph comparing desulfurization percentages for the same quadrulobe-shaped catalysts as compared to one of the cylindrical extrudes and over the same temperatures as FIG. 4.
Figure 6:
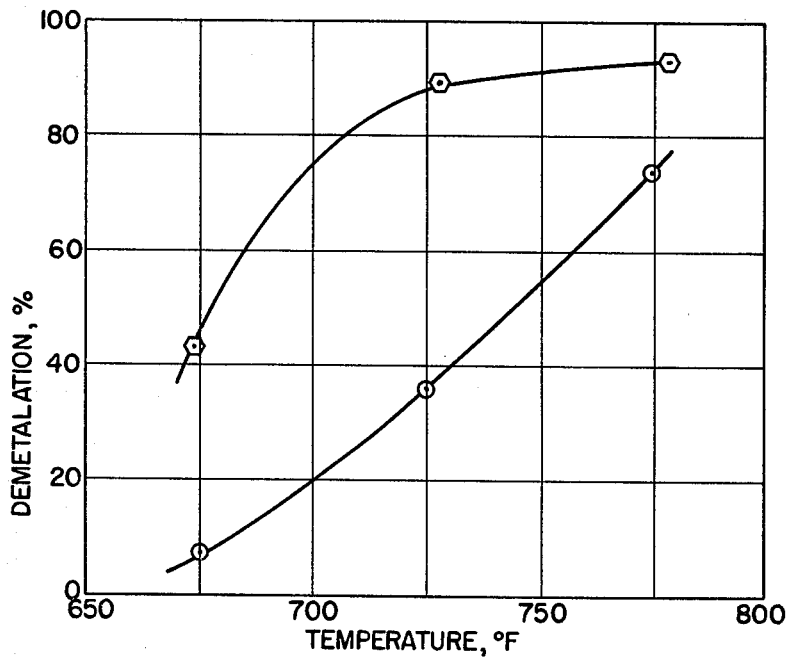
FIG. 6 is a graph comparing demetalation percentages for the same catalysts and over the same temperatures as FIG. 5.

The curves for percentage desulfurization and percentage demetalation in FIGS. 5 and 6 show that the quadrulobe catalyst imparted greater sulfur and metals removal than the 1/32-inch extrudate. The improved crackability of the resid processed over the quadrulobe catalyst is also evident from the higher hydrogen content and lower aromatics content of this hydrotreated Arabian Light vaccum resid, as shown in Table VI.

These examples show that the crackability of hydrotreated residua is improved by using quadrulobe-shaped catalysts. The quadrulobe catalyst also has a larger hydraulic radius and lower pressure drop than a 1/32-inch cylindrical extrudate. The quadrulobe additionally has a greater surface-to-volume ratio which minimizes diffusion limitations and increases the amount of metals which can be deposited on the catalyst.

These examples also show that the quadrulobe-shaped catalyst produces a higher quality FCC feedstock from petroleum residua than a smaller-diameter cylindrical catalyst having the same composition and properties. It is particularly important that CCR removal on raw resid is improved by a factor of one third. Consequently, additional resids, having lower costs and available in large quantities, can be hydrotreated over a dual bed catalyst system using quadrulobe catalysts that are prepared according to U.S. Pat. No. 4,016,067 if the quadrulobe catalysts are utilized in the second stage of this system as the small-pore component and preferably also in the first stage thereof as the large-pore component.

Because it will be readily apparent to those skilled in the art that enumerable variations, modifications, applications, and extensions of the examples and principles hereinbefore set forth can be made without departing from the spirit and scope of the invention, what is herein defined as such scope and is desired to be protected should be measured, and the invention should be limited, only by the following claims.

What is claimed is:

1. In the preparation of suitable feed stocks for catalytic cracking, an improved process for reducing Conradson carbon content, metals content, and sulfur content in residual oils in order to convert said oils into said suitable feed stocks, comprising:
   A. passing a mixture of hydrogen and said oils at hydrogen pressure of about 500 to 3000 psig, a temperature of about 600° to 850° F., and a space velocity of 0.1 to 5.0 LHSV, through a trickle bed of first catalyst, said first catalyst comprising the oxides or sulfides of a Group VIB metal and an iron group metal on a support comprising a delta or theta phase alumina, said first catalyst having also at least about 60 percent of its pore volume in pores with diameters of about 100 to 200 A, at least about 5 percent of its pore volume in pores greater than 500 A, and a surface area of up to about 110 m$^2$/g; and
   B. then passing said mixture of hydrogen and said oils through a bed of second catalyst disposed downstream of said first catalyst, said second catalyst comprising the oxides or sulfides of a Group VIB metal and an iron group metal on an alumina support, said second catalyst having a surface area of at least 150 m$^2$/g, a quadrulobe shape, and at least 50 percent of its pore volume in pores with diameters of 30 to 100 A.

2. A process as claimed in claim 1 wherein said first catalyst occupies 40% to 80% of the total catalyst volume and has a quadrulobe shape.

3. The process as claimed in claim 1 wherein said first catalyst and said second catalyst are contained in one reactor.

4. The process as claimed in claim 1 wherein said first catalyst and said second catalyst are contained in separate reactors.

5. The process as claimed in claim 2 wherein said first catalyst and said second catalyst are contained in one reactor.

6. The process as claimed in claim 2 wherein said first catalyst and said second catalyst are contained in separate reactors.

7. The process of claim 2 wherein said process includes the step of cracking said oil following said demetalation and desulfurization steps, said cracking being done at 800° to 1500° F. temperature, 1 to 5 atmospheres pressure and a space velocity of about 1 to 1000 WHSV.

8. The process of claim 2 wherein said process includes the step of hydrocracking said oil following said demetalation and desulfurization steps, said hydrocracking being done at 400° to 1000° F. temperature and 100 to 3500 psig pressure.

9. In a process for converting residual oils to suitable catalytic cracking feedstocks by reducing metals content and sulfur content by the following steps:
   A. passing a mixture of hydrogen and said oils at a hydrogen pressure of about 500 to 3000 psig, a temperature of about 600° to 850° F., and a space velocity of 0.1 to 5.0 LHSV through a trickle bed of first catalyst, said first catalyst comprising the oxides or sulfides of a group VIB metal and an iron group metal on a support comprising a delta or theta phase alumina, said first catalyst having also at least about 60% of its pore volume in pores with diameters of about 100 to 200 A, at least about 5% of its pore volume in pores greater than 500 A, and a surface area of up to about 110 m$^2$/g; and
   B. then passing said mixture of hydrogen and said oils through a bed of second catalyst disposed downstream of said first catalyst, said second catalyst comprising the oxides or sulfides of the Group VIB metal and an iron group metal on an alumina support, said second catalyst having also a surface area of at least 150 m$^2$/g and at least 50% of its pore volume in pores with diameters of 30 to 100 A,
the improvement for additionally reducing the Conradson carbon content of said residual oils, comprising the use of a quadrulobe shape for said second catalyst.

10. The improvement in the process of claim 9, wherein said Conradson carbon reduction is improved by a factor of one third.

11. The improvement in the process of claim 10, wherein said Conradson carbon reduction is effective at temperatures of about 675°–775° F.

12. The improvement in the process of claim 9, wherein said quadrulobe shape is additionally used for said first catalyst.

* * * * *

UNITED STATES PATENT AND TRADEMARK OFFICE
CERTIFICATE OF CORRECTION

PATENT NO. : 4,447,314
DATED : May 8, 1984
INVENTOR(S) : Frederick Banta

It is certified that error appears in the above—identified patent and that said Letters Patent is hereby corrected as shown below:

Column 10, line 21, "0.65" and "0.16" should be —.065— and —.016—.

Signed and Sealed this

Sixteenth Day of October 1984

[SEAL]

Attest:

GERALD J. MOSSINGHOFF

Attesting Officer

Commissioner of Patents and Trademarks